United States Patent
Kuenzi

(10) Patent No.: US 11,688,216 B2
(45) Date of Patent: Jun. 27, 2023

(54) REGIONAL LOCK-STATE CONTROL SYSTEM WITH PEOPLE LOCATOR CAPABILITY

(71) Applicant: Carrier Corporation, Jupiter, FL (US)

(72) Inventor: Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 284 days.

(21) Appl. No.: 16/610,033

(22) PCT Filed: Apr. 30, 2018

(86) PCT No.: PCT/US2018/030098
§ 371 (c)(1),
(2) Date: Oct. 31, 2019

(87) PCT Pub. No.: WO2018/204221
PCT Pub. Date: Nov. 8, 2018

(65) Prior Publication Data
US 2020/0202652 A1 Jun. 25, 2020

Related U.S. Application Data

(60) Provisional application No. 62/500,202, filed on May 2, 2017.

(51) Int. Cl.
*G07C 9/00* (2020.01)
*G07C 9/27* (2020.01)
(Continued)

(52) U.S. Cl.
CPC ..... *G07C 9/00571* (2013.01); *G07C 9/00309* (2013.01); *G07C 9/27* (2020.01);
(Continued)

(58) Field of Classification Search
CPC .............. G06Q 50/205; G07C 2209/62; G07C 2209/63; G07C 9/00309; G07C 9/00571;
(Continued)

(56) References Cited

U.S. PATENT DOCUMENTS

| 8,890,685 B1 | 11/2014 | Sookman et al. |
| 9,299,236 B2 | 3/2016 | Evans |

(Continued)

FOREIGN PATENT DOCUMENTS

| CA | 2834964 A1 | 11/2012 |
| CN | 106548553 A | 3/2017 |

(Continued)

OTHER PUBLICATIONS

"Lockdowns: Alert and Go!"; https://easterndatacomm.com/our-expertise/who-we-help/education/lockdown-system/; 2 pages.
(Continued)

*Primary Examiner* — Yong Hang Jiang
(74) *Attorney, Agent, or Firm* — Cantor Colburn LLP

(57) ABSTRACT

A lock-state control system comprises a control arrangement, mobile devices, and lock assemblies. The control arrangement includes a status module, a locator module, a control module, and at least one processor configured to execute the modules. The devices each include a device module and a processor configured to execute the modules. The assemblies are adapted to move between locked and unlocked states as commanded by the control module in response to an event. The status module is configured to send a notification to each one of the devices upon the event, thereby initiating the device module to scan for advertisements transmitted by a each respective one of the assemblies when placed in one of the locked and unlocked states.

19 Claims, 3 Drawing Sheets

(51) Int. Cl.
    *H04B 17/318* (2015.01)
    *G06Q 50/20* (2012.01)
(52) U.S. Cl.
    CPC ....... *G06Q 50/205* (2013.01); *G07C 2209/62* (2013.01); *H04B 17/318* (2015.01)
(58) Field of Classification Search
    CPC ... G07C 9/27; G07C 9/28; G07C 9/29; G07C 9/927; H04B 17/318
    See application file for complete search history.

(56) References Cited

U.S. PATENT DOCUMENTS

| | | | |
|---|---|---|---|
| 9,338,597 B2* | 5/2016 | Abu-Hakima | H04W 4/90 |
| 9,344,436 B1 | 5/2016 | Sheng et al. | |
| 2002/0101331 A1* | 8/2002 | Kitamura | G06K 17/0022 |
| | | | 340/10.3 |
| 2010/0146057 A1 | 6/2010 | Abu-Hakima et al. | |
| 2011/0285528 A1 | 11/2011 | Weinstein et al. | |
| 2014/0049364 A1 | 2/2014 | Ahearn et al. | |
| 2014/0077929 A1* | 3/2014 | Dumas | G07C 9/00571 |
| | | | 340/5.61 |
| 2014/0306802 A1 | 10/2014 | Hibbs, Jr. | |
| 2015/0077252 A1 | 3/2015 | King | |
| 2015/0191190 A1 | 7/2015 | Richardson et al. | |
| 2015/0215755 A1 | 7/2015 | Bekanich | |
| 2016/0035163 A1 | 2/2016 | Conrad et al. | |
| 2016/0055692 A1* | 2/2016 | Trani | G07C 9/20 |
| | | | 340/5.61 |
| 2016/0099963 A1* | 4/2016 | Mahaffey | G06F 21/554 |
| | | | 726/25 |
| 2016/0335882 A1 | 11/2016 | Mcdonnell et al. | |
| 2016/0371964 A1 | 12/2016 | Lyman et al. | |
| 2017/0248680 A1* | 8/2017 | Kankkunen | G01S 3/30 |
| 2017/0330226 A1* | 11/2017 | Kuenzi | G06Q 30/0251 |
| 2018/0204447 A1* | 7/2018 | Morgan | G08G 1/096716 |
| 2019/0371101 A1* | 12/2019 | Friedli | G07C 9/00571 |

FOREIGN PATENT DOCUMENTS

| | | |
|---|---|---|
| CN | 206115535 U | 4/2017 |
| EP | 3098784 A2 | 11/2016 |
| WO | 2007070298 A1 | 6/2007 |
| WO | 2015191190 A1 | 12/2015 |
| WO | 2016019065 A1 | 2/2016 |
| WO | 2016023020 A1 | 2/2016 |
| WO | 2016089837 A1 | 6/2016 |
| WO | 2018204221 A1 | 11/2018 |

OTHER PUBLICATIONS

"What Is Lokdown?", http://www.lokdown.org/; 9 pages.
ISR for Application No. PCT/US2018/030098 dated Aug. 8, 2018; 6 pages.
Written Opinion for Application No. PCT/US2018/030098 dated Aug. 8, 2018; 8 pages.
Chinese Application No. 201880044531.7 filed Dec. 31, 2019; Chinese Office Action dated May 7, 2021; 13 pages.

* cited by examiner

REGIONAL LOCK-STATE CONTROL SYSTEM WITH PEOPLE LOCATOR CAPABILITY

CROSS-REFERENCE TO RELATED APPLICATIONS

This is a National Stage Application of PCT/US2018/030098 filed Apr. 30, 2018 which claims priority to U.S. Provisional Application No. 62/500,202 filed May 2, 2017, both of which are incorporated herein by reference in their entirety.

BACKGROUND

The present disclosure relates to lock system, and more particularly, to a regional lock-state control system capable of locating people generally within a predefined region.

Traditionally, regional lock-state control systems, such as a lockdown system, may be used in predefined areas. Examples of such areas may be buildings, college campuses, and others. Upon a predefined event, all locks (e.g., door locks) that are part of the lockdown system may be automatically locked via a central controller. Unfortunately, once a lockdown event has occurred, the location of people in the area may not be well known.

BRIEF DESCRIPTION

A regional lock-state control system for operation within a region, the regional lock-state control system according to one, non-limiting, embodiment of the present disclosure includes a control arrangement including a status module, a people locator module, and at least one computing processor configured to execute the status module, and the people locator module, a plurality of mobile devices each including a mobile device module and a computing processor configured to execute the mobile device module, and a plurality of lock assemblies constructed and arranged to move between a locked state and an unlocked state, wherein the status module via the control arrangement is configured to send a lock-state notification to each one of the plurality of mobile devices upon an event thereby initiating the mobile device module to scan for a plurality of wireless advertisements transmitted by each respective one of the plurality of lock assemblies when placed in one of the locked and unlocked states.

Additionally to the foregoing embodiment, the mobile device module is configured to send a wireless status message associated with at least one detected advertisement of the plurality of wireless advertisements to the control arrangement, and wherein the wireless status message includes an address of the associated mobile device and an address of the at least one lock assembly of the plurality of lock assemblies associated with the at least one detected advertisement.

In the alternative or additionally thereto, in the foregoing embodiment, the wireless status message includes a signal strength of each one of the at least one detected advertisements.

In the alternative or additionally thereto, in the foregoing embodiment, the people locator module is configured to utilize preprogrammed lock assembly location data and the wireless status message of each one of the plurality of mobile devices to locate the plurality of mobile devices.

In the alternative or additionally thereto, in the foregoing embodiment, the regional lock-state control system is a regional lockdown control system, and the lock-state notification is a lockdown notification.

In the alternative or additionally thereto, in the foregoing embodiment, the mobile device is a smartphone.

In the alternative or additionally thereto, in the foregoing embodiment, the mobile device is an access card.

In the alternative or additionally thereto, in the foregoing embodiment, the region is a student campus.

In the alternative or additionally thereto, in the foregoing embodiment, the region is a building.

In the alternative or additionally thereto, in the foregoing embodiment, the control arrangement includes a cloud-based server including a first computer processor of the at least one computing processor, and a local controller including a second computing processor of the at least one computing processor, and wherein the status module and the people locator module are executed by the first computing processor, and a central lock control module configured to send a command to the plurality of lock assemblies upon the event that places the plurality of lock assemblies in one of the locked and unlocked states is executed by the local controller.

In the alternative or additionally thereto, in the foregoing embodiment, the controller is hard-wired to each one of the plurality of lock assemblies.

A method of operating a regional lockdown system according to another, non-limiting, embodiment includes wirelessly sending a lockdown notification to a plurality of mobile devices by a control arrangement, scanning for at least one proximate lock assembly of a plurality of lock assemblies by the plurality of mobile devices, sending a status message by each one of the plurality of mobile devices to the control arrangement, and determining a location of each respective one of the plurality of mobile devices with respect to the plurality of lock assemblies by the control arrangement.

Additionally to the foregoing embodiment, the method includes emitting a first wireless advertisement by each one of the plurality of lock assemblies for scanning by the plurality of mobile devices, wherein the first wireless advertisement includes a specific address for each respective one of the plurality of lock assemblies and whether the associated lock assembly of the plurality of lock assemblies is in a locked state or an unlocked state, wherein the data associated with the first wireless advertisement is sent by each respective one of the plurality of mobile devices as part of the status message.

In the alternative or additionally thereto, in the foregoing embodiment, the first wireless advertisement utilizes a Bluetooth protocol.

In the alternative or additionally thereto, in the foregoing embodiment, the control arrangement includes a cloud-based server having a computing processor and an electronic storage medium configured to store geographic locations of each lock assembly of the plurality of lock assemblies.

In the alternative or additionally thereto, in the foregoing embodiment, wirelessly sending the lockdown notification is repetitions for tracking movement of each one of the plurality of mobile devices.

In the alternative or additionally thereto, in the foregoing embodiment, the method includes initiating an advertisement by each one of the plurality of locks for scanning by the plurality of mobile devices and wirelessly sending the proximate lock message to the control arrangement by each mobile device of the plurality of mobile devices associated with the location with respect to the at least one proximate lock assembly of the plurality of lock assemblies.

In the alternative or additionally thereto, in the foregoing embodiment, wirelessly sending the lockdown notification is repetitious for tracking movement of each one of the plurality of mobile devices.

In the alternative or additionally thereto, in the foregoing embodiment, the method includes triggering a lockdown event by the control arrangement which initiates sending of the lockdown notifications.

In the alternative or additionally thereto, in the foregoing embodiment, the method includes emitting a second wireless advertisement by each one of the plurality of mobile devices for scanning by the other mobile devices of the plurality of mobile devices, wherein the second wireless advertisement includes a specific address for each respective one of the plurality of mobile devices.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
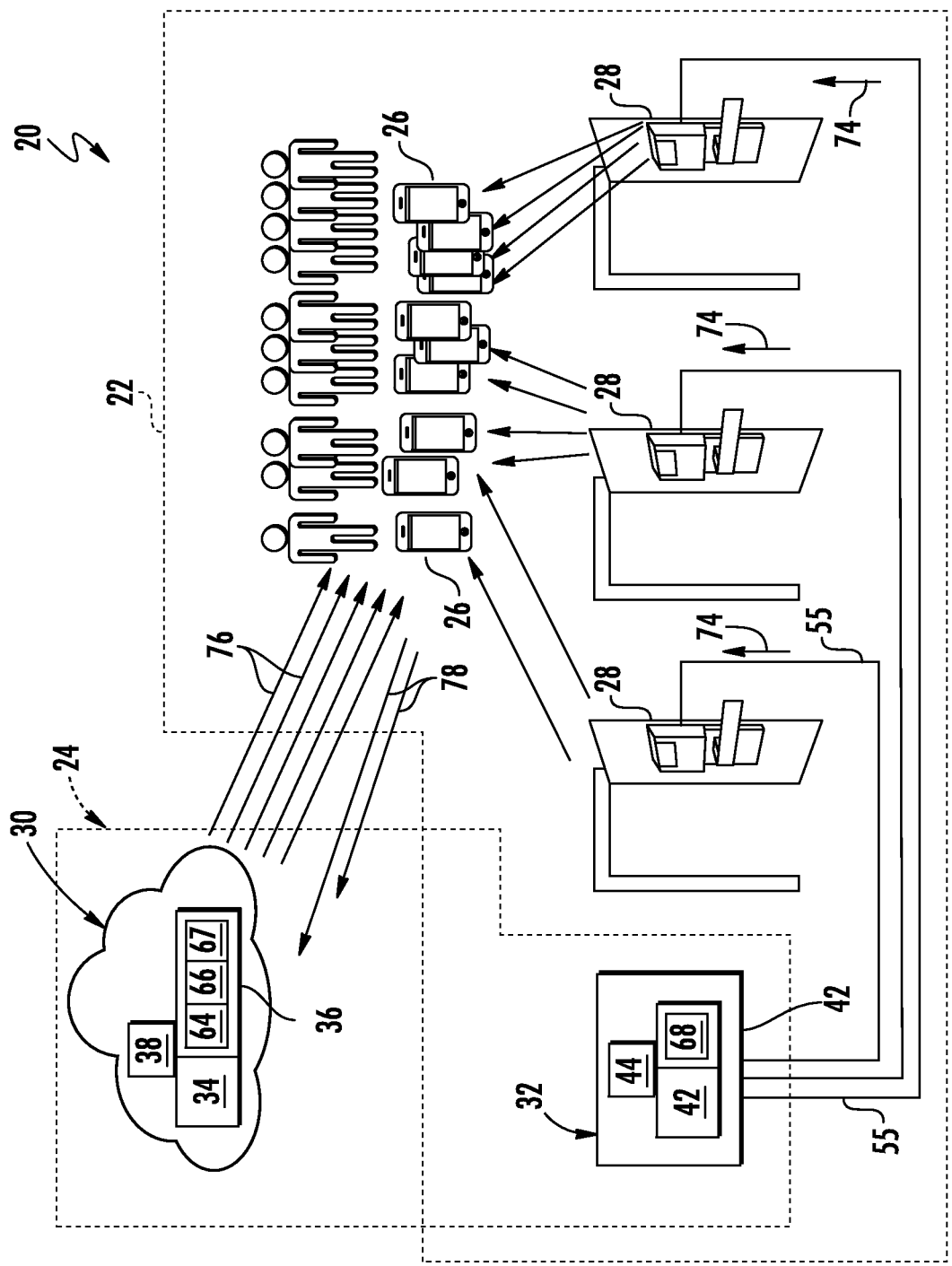
FIG. 1 is a schematic of a regional lock-state control system as one, non-limiting, exemplary embodiment of the present disclosure.

Referring to FIG. 1, a regional lock-state control system 20 may be operable within a region 22, and may include a control arrangement 24, a multitude of mobile devices 26, and a plurality of lock assemblies 28 that may be dispersed throughout the region 22. The regional lock-state control system 20 may be a regional lockdown system, or alternatively, may be a regional unlocking system. Examples of a region 22, may include an office building, a student campus, a hotel, and others. The control arrangement 24 may include a server 30 that may be remote, and a controller 32 that may be local and located within the region 22. The remote server 30 may be cloud-based, and in one example, may not be in direct communication with the local controller 32. It is further contemplated and understood that the controller 32 may be an integral part of the server 30 (i.e., may share the same processor and computer readable storage medium).

Figure 2:
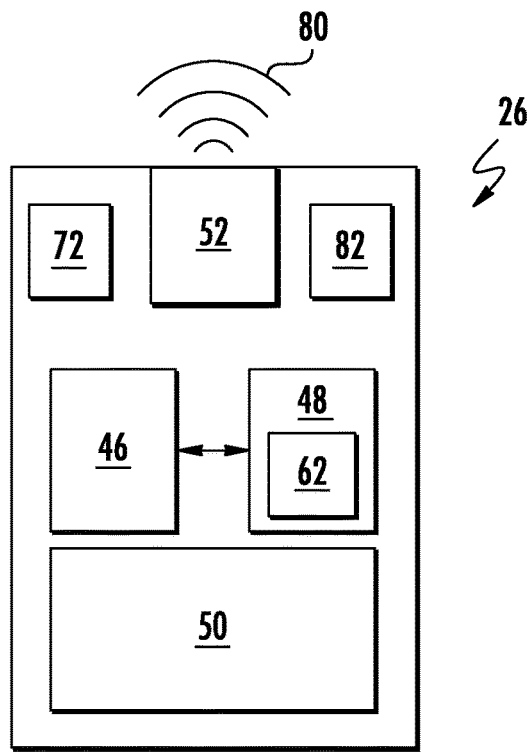
FIG. 2 is a schematic of a mobile device of the regional lock-state control system.

The remote server 30 may include a computing processor 34 (e.g., microprocessor), an electronic storage medium 36 that may be computer readable and writeable, and a transceiver 38 for wireless communications. The controller 32 may include a computing processor 40 (e.g., microprocessor), an electronic storage medium 42 that may be computer readable and writeable, and in some applications, a transceiver 44 for wireless communications. Referring to FIG. 2, each one of the mobile devices 26 may include a computing processor 46 (e.g., microprocessor), an electronic storage medium 48 that may be computer readable and writeable, a user interface 50, and a transceiver 52 for wireless communications.

In one embodiment, each one of the lock assemblies 28 may not be generally 'smart', and instead, may be generally powered, actuated, and controlled by the controller 32. In this embodiment, the local controller 32 may be hardwired to each lock assembly 28 (see hardwired pathways 55 in FIG. 1). In another example, each lock assembly may include and receives power via an energy storage device or battery (not shown). In yet another embodiment, and referring to FIG. 3, each one of the lock assemblies 28 may include a computing processor 54 (e.g., microprocessor), an electronic storage medium 56 that may be computer readable and writeable, and a transmitter 58 for transmitting an advertisement or beacon 60. In some applications, the transmitter 58 may be a transceiver for additional wireless communications.

Figure 3:
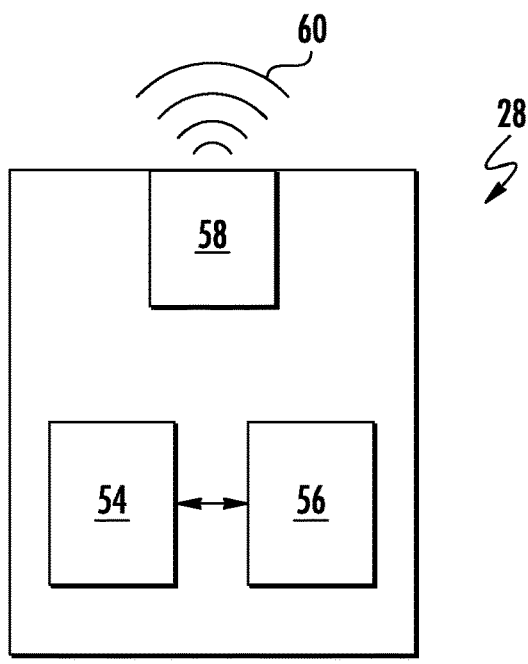
FIG. 3 is a schematic of lock assembly of the regional lock-state control system.

Referring to FIGS. 1 through 3, the regional lock-state control system 20 may further include a plurality of mobile device modules 62, a status module 64 that may be a lock status module, a people locator module 66, and a central lock control module 68. Each one of the plurality of mobile device modules 62 may be programmed into a respective one of the plurality of mobile devices 26 (i.e., stored in the medium 48 and executed by the processor 46). The status module 64 and the people locator module 66 may be programmed into the server 30 (i.e., stored in the medium 36 and executed by the processor 34). The central lock control module 68 may be programmed into the controller 32 (i.e., stored in the medium 42 and executed by the processor 40).

Each mobile device 26 may be generally carried by a respective person or user known to be in the region 22 for a length of time. In one example, the mobile device 36 may be a smartphone. In another embodiment, the mobile device 36 may be an integral part of an identification and/or access badge, or card. The mobile device 26 (e.g., smartphone, badge, or card) may be configured to operate any number of the lock assemblies 28 via techniques known to one having skill in the art. It is contemplated and understood that the mobile devices 26 may not be part of the regional lock-state control system 20, and instead, may be host devices used to execute the mobile device modules 62. Similarly, the server 30 may not be part of the regional lock-state control system 20, and instead, may be a host server used to execute the mobile device modules 64, 66 and store data of the system 20.

Referring to FIGS. 1 and 2, the people locator module 66 of the regional lock-state control system 20 may determine the location of mobile device users in the region 22 via one of two different techniques. The first technique may utilize the advertisement 60 and the second technique may utilize a geographic position application 72 of the mobile device 26. The geographic position application 72 is configured to determine the geographic position of the mobile device 26 using one or more positioning systems or protocols of a type well known in the art, such as Global Positioning Systems (GPS), Global Navigation System (GLONASS), Global Navigation Satellite System (GNSS), Galileo, Long Range Navigation (LORAN), National Marine Electronics Association (NMEA), Trimble Standard Interface Protocol (TSIP), DELORME® EARTHMATE), Rockwell PLGR Protocol, iBeacon®, and SIRF®, to name a few non-limiting examples. It is also appreciated that the geographic position application 72 may include local, regional, or site-wide systems of a type well known in the art, such as radio frequency identification (RFID), infrared (IR), sensor networks, Wi-Fi-based positioning, and Ultra-Wideband (UWB) positioning systems, to name a few non-limiting examples. In one embodiment, the geographic position application 72 may work in conjunction with the people locator module 66 to determine the location of each user of each mobile device 26 relative to the plurality of lock assemblies 28.

Figure 4:
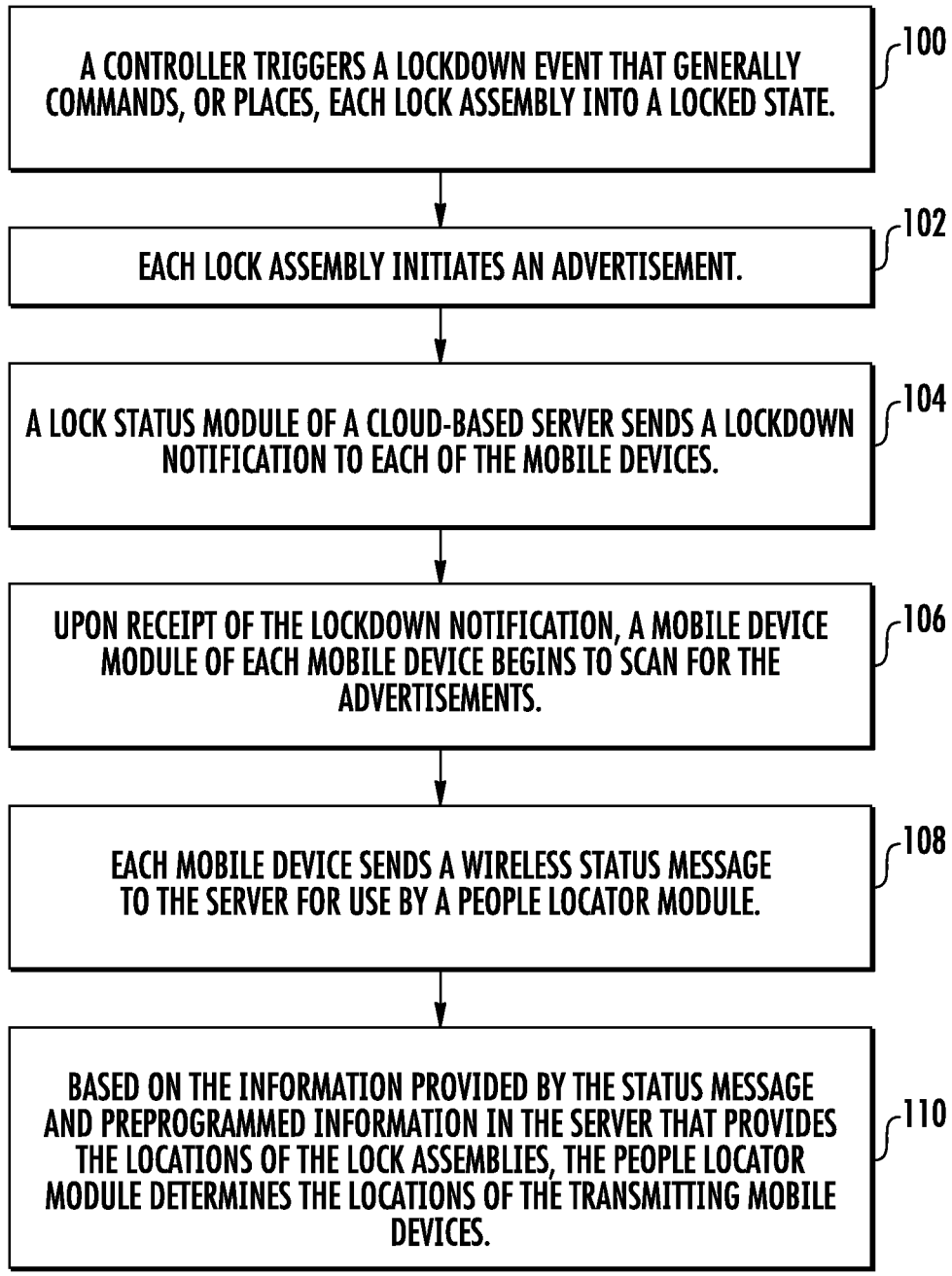
FIG. 4 is a flow chart illustrating a method of operating the regional lock-state control system.

Referring to FIG. 4, a method of operating the regional lock mode system 20 is illustrated. To simplify explanation, the example of a regional lockdown system 20 will be elaborated upon in terms of operation. At block 100, the controller 30 may trigger a lockdown event that generally commands, or places, each lock assembly 28 into a locked state. Upon the lockdown command (see arrows 74 in FIG. 1), and at block 102, each lock assembly 28 may initiate the advertisement 60. In one embodiment, the advertisement 60 may be wireless, may be a short range advertisement, and/or may be an advertisement sent via Bluetooth®. The lockdown command 74 may be sent over wired or wireless pathways.

At block 104, the status module 64 of the cloud-based server 30 may send a lockdown notification (see arrows 76 in FIG. 1) to each of the mobile devices 26. In one example, the region 22 may be a campus, and the lockdown notification 76 may be sent to every mobile device 26 (e.g., smartphone) on campus 22. At block 106, and upon receipt of the lockdown notification 76, the mobile device module 62 of each mobile device 26 may begin to scan for the advertisement 60, which may include an address of the specific lock assembly 28 and an indication that the lock assembly 28 is in the locked state or the unlocked state.

The mobile device module 62 for each mobile device 26 may be registered by a process of downloading the module from, for example, an application store and signing in with an account. The account may be obtained via various means, but the account may be associated with, or known by, the locator module 66. The account may be created by region 22 administrators who may create the account in one of the modules 66, 68, and provide to the user of the mobile device 26. Alternatively, the account may be created in a separate system (e.g., Facebook® or Google® login) and the account may be registered into the modules 66, 68 so that it is known. After logging into the module 62, the module 62 may communicate with the modules 66, 68 so that the modules 66, 68 are aware of every registered mobile device 26.

Optionally, the module 62 for each mobile device 26, may have functionality to download mobile credentials from a credential module 67 (see FIG. 1) that may be loaded into the server 30 of the control arrangement 24. The credential module 67 may provide access rights to the mobile devices 26 so that the users may open the lock assemblies 28 (i.e., unlock) with the mobile device 26 using techniques for mobile credentialing that include the transfer via Near Field Communications (NFC) or Bluetooth using the transceivers 52, 58, and other means generally known to one having skill in the art.

At block 108, each mobile device 26 may send a wireless status message (see arrow 78) to the server 30 for use by the people locator module 66. The status message 78 may include the signal strength of each advertisement 60 detected (i.e., or an averaging of recently received advertisements 60), the address of each advertisement 60, an address or identification of the associated mobile device 26, and the lock status of the associated lock assembly 28. At block 110 and based on the information provided by the status message 78 and preprogrammed information in the server 30 that provides the locations of the lock assemblies 28, the people locator module 66 may determine the location of the transmitting mobile devices 26. That is, the server 30 may determine which users are located near which lock assemblies 28, and which lock assemblies are in the locked state. This may be accomplished by calculating distances based on signal strength or triangulation based upon multiple status messages 78. Or, it may be accomplished based on proximity alone (i.e., being near a lock assembly means the user must be at a particular location).

It is contemplated and understood that the message 78 may further include information about the individual user of a particular mobile device 26. For example, the module 62 may provide, via the interface 50, an opportunity for a user to specify handicap conditions. The module 62 may also activate a microphone 82 of the mobile device 26 enabling the listening for sounds (e.g., gun shots) that may be sent as data included as part of the message 78. Other information that may be included as part of the message 78 may be anything a user chooses to enter into the mobile device 26, such as the need for help due to, for example, an injury. Yet further, biometric information (e.g., heartbeat) may be included as part of the message 78 indicating a user is in distress.

It is contemplated and understood that the sending of the lockdown notification 76 may be repetitious causing the system to reinitiate the determination of locations of the mobile devices 26. This re-initiation enables tracking of the users of the mobile devices 26 throughout the region 22. This repetition may continue until the server 30 sends a cease lockdown initiative to the mobile devices 26. By enabling the tracking of the mobile devices 26, a central command post (e.g., police or security station) may receive the tracking and other data from the server 30, and better plan and conduct, for example, evacuations of the region 22. Such evacuations may be based upon population concentrations and dynamics. The users of the mobile devices 26 may be instructed via the interface 50 of the mobile devices 26.

It is further contemplated and understood, and similar to block 106, the mobile devices 26 may also each transmit an advertisement 80 (see FIG. 2) that includes the address of the respective mobile device. Other mobile devices 26 may receive the advertisements 80, and as part of the wireless status message 78, or as a separate message, may transmit the mobile device address data and signal strength relative to the advertisements 80 to the locator module 66. The locator module 66, via the advertisements 60, 80 may then use this data to determine the locations of the various mobile devices 26 relative to the lock assemblies 28 and relative to the other mobile devices 26.

The various functions described above may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. It is understood that an application running on a server and the server, may be a component. One or more applications may reside within a process and/or thread of execution and an application may be localized on one computer and/or distributed between two or more computers.

Advantages and benefits of the present disclosure include a regional lock-state control system 20 capable of leveraging phone network systems to locate and track people, monitor lock states, and gather other information when a region is in, for example, a lockdown event.

While the present disclosure is described with reference to illustrated embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A regional lock-state control system for operation within a region, the regional lock-state control system comprising:
    a plurality of mobile device modules each operable to receive a wireless lock-state notification from a server; and
    wherein each of the plurality of mobile device modules is operable to, responsive to the lock-state notification, determine proximity data that is used to perform proximity operations comprising:
        determining distances from each of the plurality of mobile device modules to each of a plurality of lock assemblies; and
        determining, for each of the plurality of mobile device modules, a closest one of the plurality of lock assemblies;
    wherein each of the plurality of mobile device modules is operable to send a wireless status message comprising the proximity data of each of the plurality of mobile device modules.

2. The regional lock-state control system set forth in claim 1, wherein:
    each one of the plurality of lock assemblies is operable to transmit an advertisement that includes data on a lock-state; and
    each of the plurality of mobile device modules is operable to, responsive to the lock-state notification, use the advertisement to determine the proximity data.

3. The regional lock-state control system set forth in claim 2, wherein the wireless status message includes a signal strength of each advertisement transmitted by each of the plurality of lock assemblies.

4. The regional lock-state control system set forth in claim 1, wherein:
    the plurality of mobile device modules are each configured to, responsive to the wireless lock-state notification, send a lock-state command to the plurality of lock assemblies;
    each of the plurality of lock assemblies is configured to, responsive to the lock-state command, transmit an advertisement that includes data on a lock-state;
    each of the plurality of mobile device modules is configured to, responsive to the lock-state notification, use the advertisement to determine the proximity data; and
    the data on a lock state includes locked and unlocked states.

5. The regional lock-state control system set forth in claim 2, wherein the regional lock-state control system is a regional lockdown control system, and the lock-state notification is a lockdown notification.

6. The regional lock-state control system set forth in claim 5, wherein the plurality of mobile device modules are incorporated within a plurality of mobile devices.

7. The regional lock-state control system set forth in claim 6, wherein each of the plurality of mobile devices comprises an access card.

8. The regional lock-state control system set forth in claim 1, wherein the region is a student campus.

9. The regional lock-state control system set forth in claim 1, wherein the region is a building.

10. The regional lock-state control system set forth in claim 1, wherein the server includes a cloud-based server.

11. The regional lock-state control system set forth in claim 10, wherein the cloud-based server performs the proximity operations.

12. A method of operating a regional lockdown system comprising:
    receiving at each of a plurality of mobile device modules a wireless lock-state notification from a server;
    wherein each of the plurality of mobile device modules is operable to, responsive to the lock-state notification, determine proximity data that is used to perform proximity operations comprising:
        determining distances from each of the plurality of mobile device modules to each of a plurality of lock assemblies; and
        determining, for each of the plurality of mobile device modules, a closest one of the plurality of lock assemblies;
    wherein each of the plurality of mobile device modules is operable to send a wireless status message comprising the proximity data of each of the plurality of mobile device.

13. The method set forth in claim 12, wherein:
    each one of the plurality of lock assemblies is operable to transmit an advertisement that includes data on a lock-state; and
    each of the plurality of mobile device modules is operable to, responsive to the lock-state notification, use the advertisement to determine the proximity data.

14. The method set forth in claim 13, wherein the wireless status message includes a signal strength of each advertisement transmitted by each of the plurality of lock assemblies.

15. The method set forth in claim 12, wherein:
    the plurality of mobile device modules are each configured to, responsive to the wireless lock-state notification, send a lock-state command to the plurality of lock assemblies;
    each of the plurality of lock assemblies is configured to, responsive to the lock-state command, transmit an advertisement that includes data on a lock-state;
    each of the plurality of mobile device modules is configured to, responsive to the lock-state notification, use the advertisement to determine the proximity data; and
    the data on a lock state includes locked and unlocked states.

16. The method set forth in claim 12, wherein the lockdown notification is repetitious for tracking movement of each of the plurality of mobile device modules.

17. The method set forth in claim 12, wherein the server is cloud-based.

18. The method set forth in claim 12, wherein:
- the server is operable to send the proximity data to a command post; and
- the command post is operable to use the proximity data to develop a response plan for responding to the lockdown event.

19. The regional lock-state control system set forth in claim 1, wherein:
- the server is operable to send the proximity data to a command post; and
- the command post is operable to use the proximity data to develop a response plan for responding to the lockdown event.

\* \* \* \* \*